(12) United States Patent
Foladare et al.

(10) Patent No.: US 6,349,209 B1
(45) Date of Patent: *Feb. 19, 2002

(54) METHOD FOR SIMPLIFIED TELEPHONE DIALING

(75) Inventors: Mark Jeffrey Foladare, Kendall Park; Shelley B. Goldman, East Brunswick; David Phillip Silverman, Somerville; Robert S. Westrich, Middletown, all of NJ (US)

(73) Assignee: AT&T Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/936,014

(22) Filed: Sep. 23, 1997

(51) Int. Cl.[7] .................................................. H04B 1/00
(52) U.S. Cl. ...................... 455/445; 455/31.2; 455/458
(58) Field of Search ................................. 455/426, 445, 455/31.2, 31.3, 458, 505, 432, 564, 404, 414, 417, 403; 379/355, 59

(56) References Cited

U.S. PATENT DOCUMENTS

| | | | |
|---|---|---|---|
| 4,852,146 A | * | 7/1989 | Hathcock et al. ............. 379/58 |
| 5,148,473 A | * | 9/1992 | Freeland et al. ............. 455/564 |
| 5,216,703 A | * | 6/1993 | Roy ............................. 379/59 |
| 5,327,486 A | | 7/1994 | Wolff et al. |
| 5,339,352 A | * | 8/1994 | Armstrong et al. ........... 379/58 |
| 5,476,671 A | * | 12/1995 | Partridge, III .............. 455/417 |
| 5,533,111 A | | 7/1996 | Schlanger |
| 5,644,626 A | * | 7/1997 | Carlsen et al. ............. 455/31.2 |
| 5,734,981 A | * | 3/1998 | Kennedy, III et al. ...... 455/445 |
| 5,737,701 A | * | 4/1998 | Rosenthal et al. .......... 455/411 |
| 5,778,313 A | * | 7/1998 | Fougnies .................... 455/406 |
| 5,802,149 A | * | 9/1998 | Hanson ........................ 379/89 |
| 5,822,310 A | * | 10/1998 | Chennakeshu et al. ........ 455/10 |
| 5,831,545 A | * | 11/1998 | Murray et al. ............. 455/31.3 |
| 5,854,984 A | * | 12/1998 | Buhrmann et al. ......... 455/31.3 |
| 5,943,611 A | * | 8/1999 | Molne ........................ 455/575 |
| 5,970,388 A | * | 10/1999 | Will ........................... 455/458 |
| 5,987,102 A | * | 11/1999 | Elliott et al. ............. 379/93.17 |
| 6,011,953 A | * | 1/2000 | Foladare et al. ........... 455/38.1 |
| 6,125,113 A | * | 9/2000 | Farris et al. ................ 370/389 |

* cited by examiner

Primary Examiner—Nguyen T. Vo
Assistant Examiner—Makoto Aoki
(74) Attorney, Agent, or Firm—Oliff & Berridge, PLC

(57) ABSTRACT

An easy to use (easy-reach) dialing system that connects a calling party with a called party based on data received over a first communication channel and a second communication channel. A calling party calls an easy-reach device and sends data to the easy-reach device over a second communication channel. The easy-reach device calls the called party based on data received over the second communication channel and connects the calling party with the called party.

25 Claims, 5 Drawing Sheets

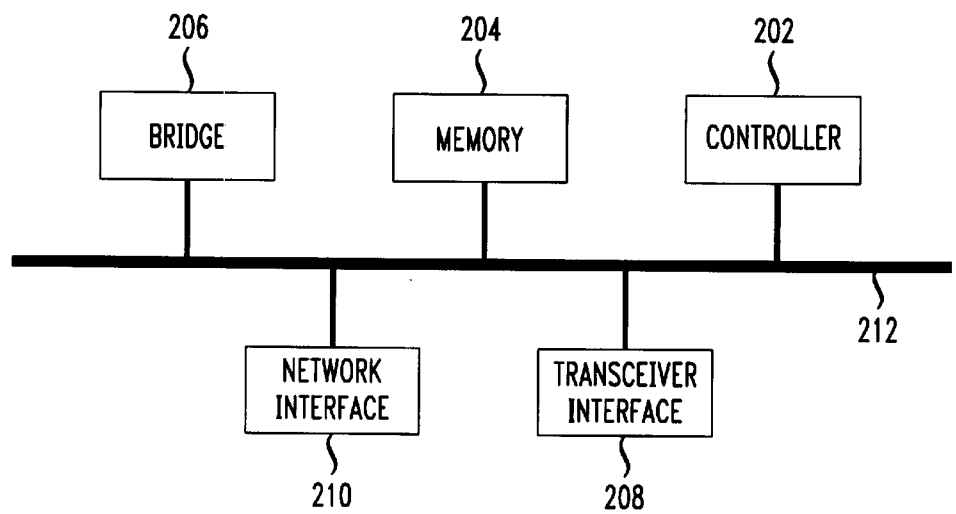

METHOD FOR SIMPLIFIED TELEPHONE DIALING

BACKGROUND OF THE INVENTION

1. Field of Invention

This invention relates to telecommunication systems.

2. Description of Related Art

Various methods for dialing a telephone number are currently available. These include speed dialing, automatic redialing, or speaking a telephone number for example. However, many times these methods cannot be used, such as when calling from a pay phone, for example. In these situations, a calling party must either remember and dial the telephone number, or if voice recognition is available, be in a low noise environment. Accordingly, new technology is needed to provide a more convenient way for dialing a telephone number without special environments.

SUMMARY OF THE INVENTION

An easy-reach system provides a method and apparatus for a calling party (e.g., a subscriber) to establish communication with a called party (i.e., desired destination terminal) without memorizing numbers, or requiring complex procedures or special environments. The calling party establishes communication with an easy-reach device using a first communication channel (e.g., a telephone call) and sends data identifying the called party (e.g., the called party number) to the easy-reach device using a second communication channel (e.g., a 2-way pager transmission). The easy-reach device uses the data received over the second communication channel to identify the called party, and then connects the calling party with the called party.

For example, the calling party selects the data transmitted through the second communication channel by scrolling through names and/or numbers stored in a pager to identify or choose a called party. The calling party calls the easy-reach device and transmits a pager data message including called party information that identifies the called party number (or includes the called party number itself) by activating a transmit function on the pager. The pager transmits the called party information to the easy-reach device and the easy-reach device dials the called party number and connects the called party with the calling party.

BRIEF DESCRIPTION OF THE DRAWINGS

The invention is described in detail with reference to the following drawings, wherein like numerals represent like elements, and wherein:

FIG. 3 is a block diagram of an easy-reach device;

FIG. 4 shows an example format for a database used by the easy-reach device;

DETAILED DESCRIPTION OF PREFERRED EMBODIMENTS

Figure 1:
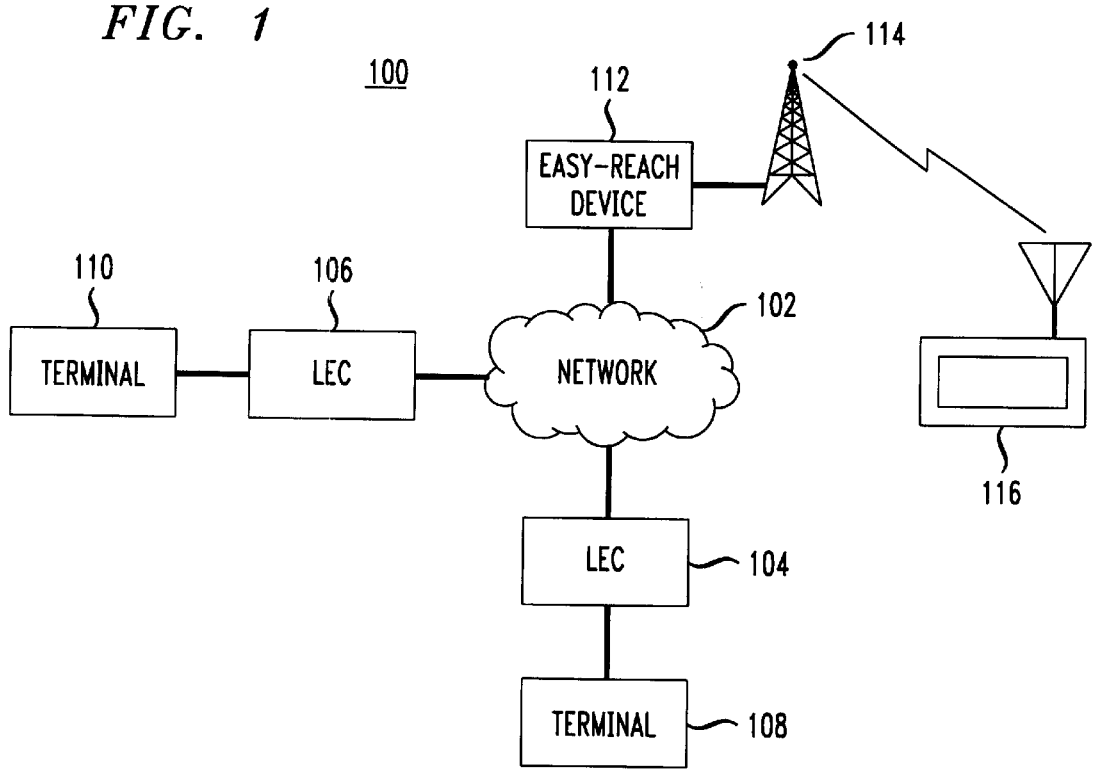
FIG. 1 is a block diagram of an easy-reach system.

An exemplary embodiment of an easy-reach system 100 is shown in FIG. 1. The easy-reach system includes terminals 108, 110, local exchange carriers (LEC) 104, 106, a network 102, an easy-reach device 112, a transceiver 114, and a personal communication device such as a pager 116. The following discussion uses the pager 116 as an example, but any device that performs similar functions may be used. For example, a cellular phone or a personal computer with communication capabilities may be used.

When a calling party at the terminal 108 desires to call a called party at the terminal 110, the calling party calls the easy-reach device 112 and also transmits a pager data message from the pager 116 to identify the called party number. The calling party may be returning a prior page, for example. When the calling party's call and the pager data message is received, the easy-reach device 112 dials the called party and connects the calling party with the called party.

Figure 2:
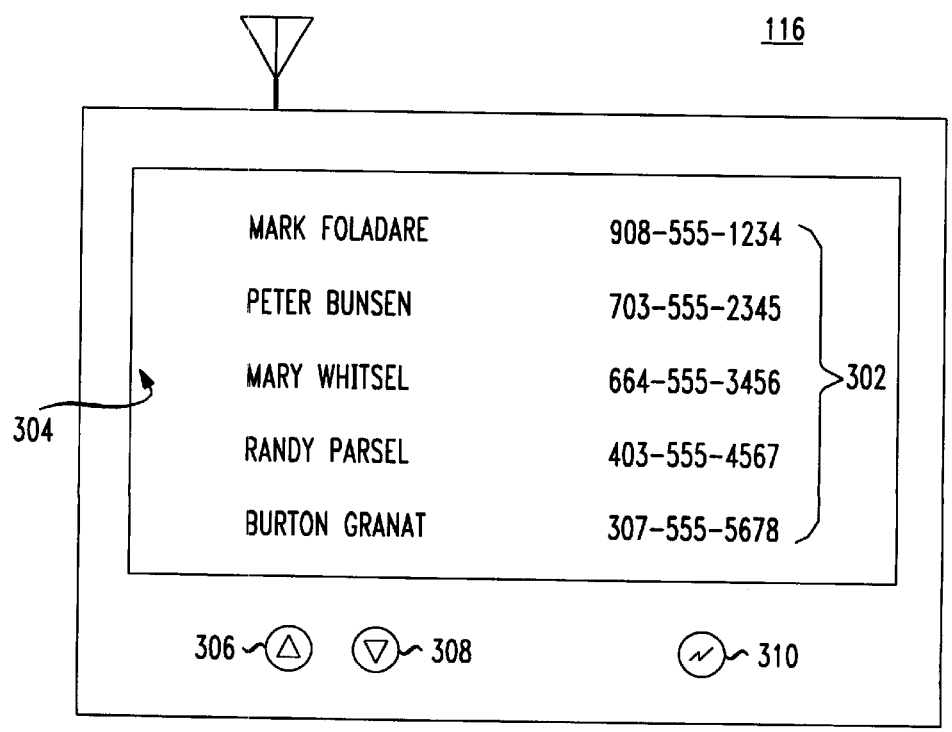
FIG. 2 is an example pager display.

The calling party determines the called party by scrolling through a directory on the pager 116, for example, and selecting a directory entry. FIG. 2 shows an example of a pager display 302 of the pager 116. The display 302 may display names, telephone numbers, or other called party identifiers. These may have been programmed earlier by the calling party, or could have been entered automatically by a paging system as pages are received by the pager 116. An up button 306 and a down button 308 can be used to scroll the names and telephone numbers on the display and to move a cursor 304 that points to the name and/or telephone number of the called party (the called party number). When the cursor 304 is pointing to the name and telephone number of the called party, the calling party may push the transmit button 310 to transmit a pager data message to the easy-reach device 112.

When the transmitted pager data message is received by the easy-reach device 112 via the transceiver 114, for example, the easy-reach device 112 dials the called party at the terminal 110 based on the transmitted pager data message, and connects the calling party with the called party by connecting the terminal 108 with the terminal 110.

FIG. 3 shows a block diagram of the easy-reach device 112 that includes a bridge 206, a memory 204, a controller 202, a network interface 210, and a transceiver 208. The above components are all coupled together by a signal bus 212. While FIGS. 1 and 3 show a centralized easy-reach device 112, the easy-reach device 112 may be distributed throughout the network 102.

The easy-reach device 112 processes calling party calls and pager data messages using a database 400 in the memory 204, as shown in FIG. 4. The database 400 may be in one location or distributed across the network 102. The database 400 contains an entry 401 for each calling party. Each entry 401 in the database 400 includes a calling party field 402 that identifies a calling party, and a called party field 404. When no activity associated with the calling party is taking place (i.e., the calling party is not logged in and no current pager data message from the pager 116 has been received), the called party field 404 is clear (i.e., contains a value of zero, for example).

In the exemplary embodiment, the calling party may first call the easy reach device 112 from the terminal 108 and then transmit the pager data message, or vise-versa. The order in which the above two events occur does not matter. When the calling party transmits a pager data message from the pager 116, the controller 202 receives the pager data message via the transceiver 114 and the transceiver interface 208. After receiving the pager data message, the controller 202 identifies the calling party based on the pager identification number (a pager capcode) included in the pager data message; locates a entry 401 in the database 400 associated with the calling party; and stores the called party information included with the pager data message in the called party field 404 of the entry 401.

When the calling party calls the easy-reach device 112 from the terminal 108, the call arrives at the controller 202 via the LEC 104 and the network interface 210. The controller 202 identifies the calling party based on the call, for example by information such as which telephone number the calling party has dialed to reach the easy-reach device 112, or from Caller-ID supplied by Automatic Name Identification (ANI).

Having identified the calling party, the controller 202 locates the entry 401 in the database 400 associated with the calling party, and determines whether the called party information is stored in the called party field 404 of the database entry 401. If the calling party has transmitted the pager data message before calling the easy reach device 112, the called party information will already be stored in the called party field 404.

However, if the calling party called the easy reach device 112 before transmitting the pager data message, the called party field 404 will be empty. In that case the controller 202 holds the calling party's call and waits for the pager data message to arrive. If the pager data message is not received after a predetermined time interval, then an error message is output to the calling party and the calling party is disconnected.

When the pager data message finally arrives, the controller 202 determines the called party number from the pager data message; dials the called party number via the network interface 210; and connects the calling party with the called party via the bridge 206.

Figure 5:
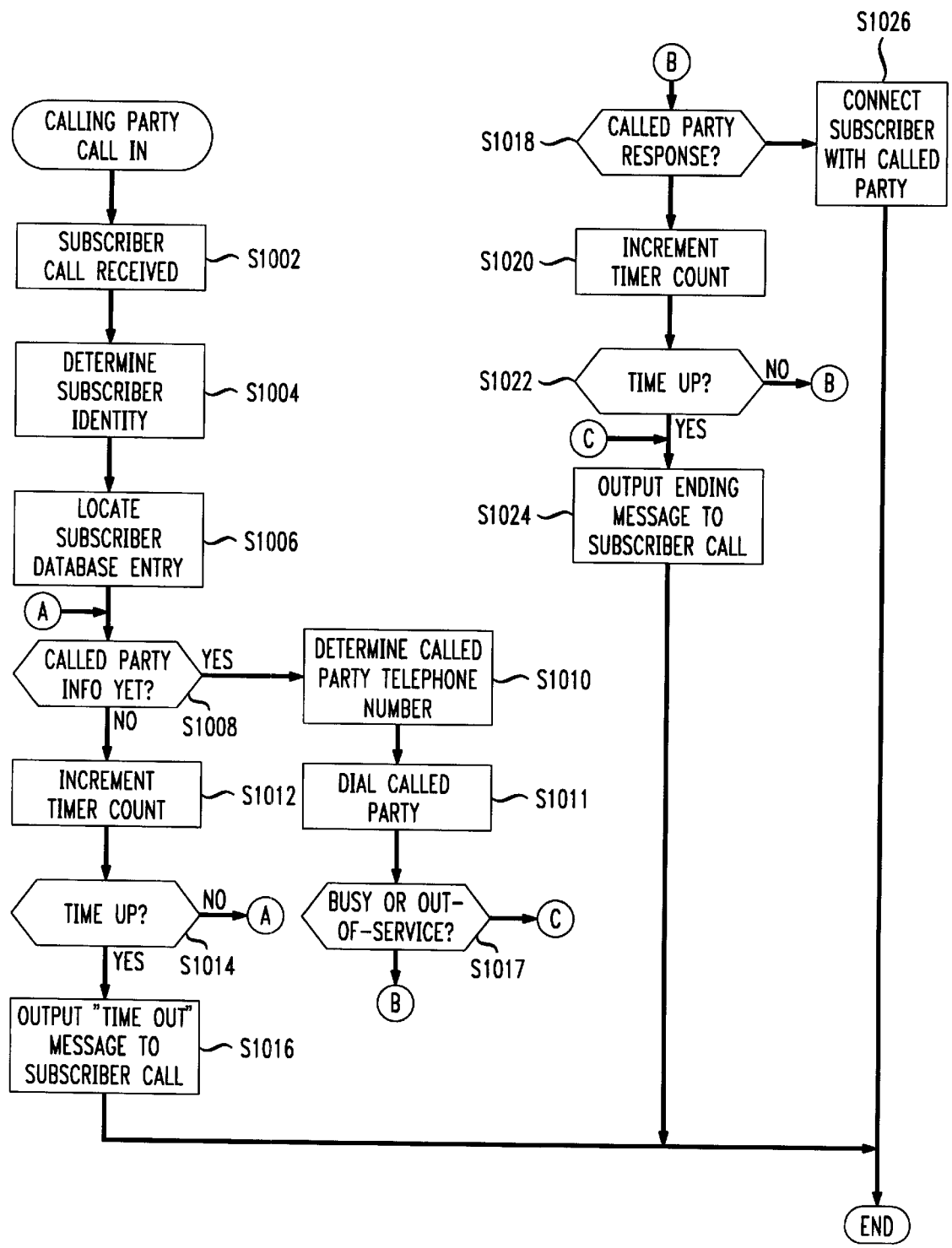
FIG. 5 is a flow chart for processing information received over a first communication channel in a first embodiment of the invention.

FIG. 5 shows a process performed by the controller 202 of the easy-reach device 112 in the exemplary embodiment. At step S1002, the controller 202 receives the calling party's call and then advances to step S1004. At step S1004, the controller 202 determines the identity of the calling party based on the calling party's call and advances to step S1006.

At step S1006, the controller 202 locates the entry 401 associated with the calling party from the memory 204 and advances to step S1008. At step S1008, the controller 202 checks whether the pager data message has been received by checking the called party field 404 of the entry 401 for example. If the pager data message has not been received (i.e., the called party information is not found in the called party field 404), the controller 202 advances to step S1012 and increments a timer. Then the controller 202 advances to step S1014. At step S1014, the controller 202 checks whether the timer has exceeded a maximum value. If the timer has not exceeded a maximum value, the controller 202 returns to step S1008; otherwise the controller 202 advances to step S1016. At step S1016, the controller 202 outputs an appropriate "time out" ending message to the calling party, and ends the process.

At step S1008, if the pager data message has been received or the called party information is found in the called party field 404, the controller 202 advances to step S1010. At step S1010, the controller 202 determines the called party number from the called party information and advances to step S1011. At step S1011, the controller 202 dials the called party number and advances to step S1017. At step S1017 the controller 202 checks for a busy or out-of-service signal. If a busy or out-of-service signal is received, the controller 202 advances to step S1024.

At step S1017, if no busy or out-of-service signal is received, the controller 202 advances to step S1018. At step S1018, the controller 202 checks whether the called party has responded (i.e., answered the phone). If the called party has not yet responded, the controller 202 advances to step S1020. At step S1020, another timer is incremented and the controller 202 advances to step S1022. At step S1022 the controller 202 checks whether the timer has exceeded a maximum value. If at step S1022 the timer has not exceeded the maximum value, the controller 202 returns to step S1018; otherwise the controller 202 advances to step S1024.

At step S1018, if the called party has responded, the controller 202 advances to step S1026. At step S1026, the controller 202 connects the calling party with the called party, and ends the process. At step S1024, the controller 202 outputs an appropriate ending message to the calling party and ends the process. Step S1024 may be implemented in other, optional ways, such as having the easy-reach device 112 repeatedly dial the called party at predetermined intervals. Then, upon establishing communication with the called party, the easy-reach device 112 outputs a "please hold" message to the called party, and pages the calling party so that the calling party may dial the easy-reach device 112 and be connected with the called party.

Figure 6:
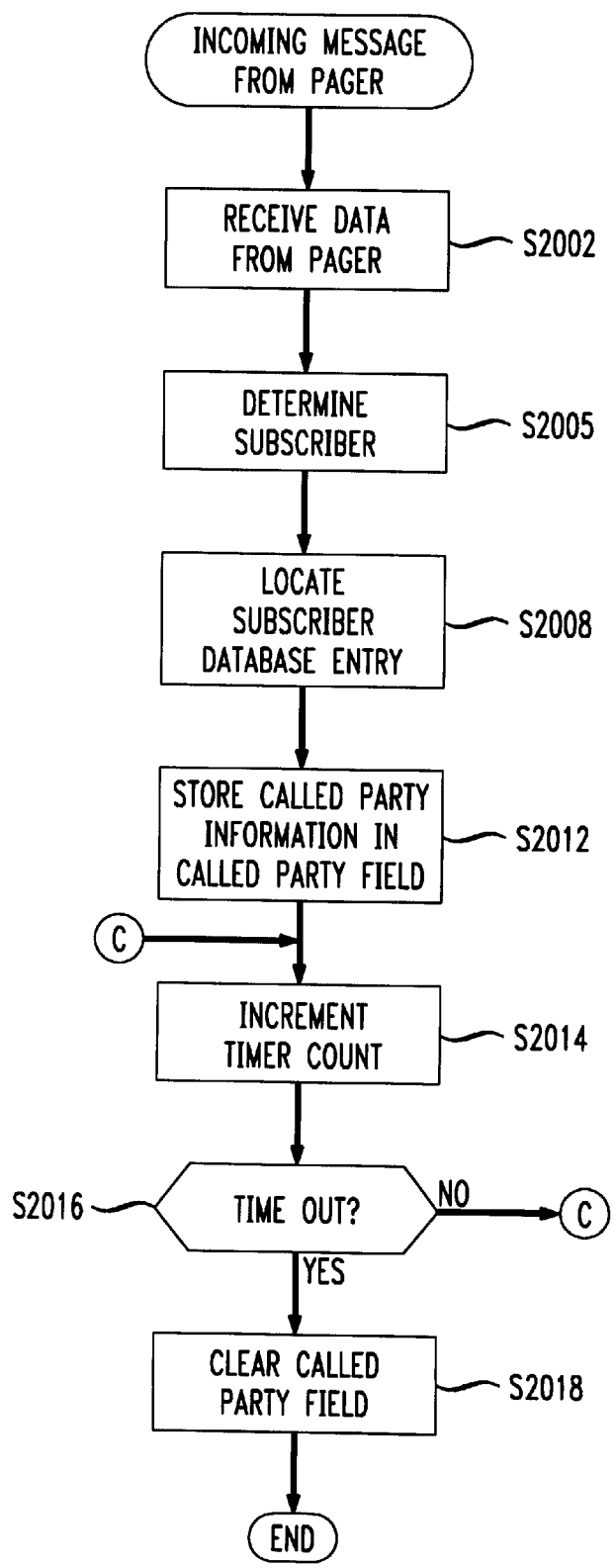
FIG. 6 is a flow chart for processing information received over a second communication channel in the first embodiment of the invention.

FIG. 6 shows the process of the controller 202 when a pager data message from the pager 116 is received by the easy-reach device 112. This process works the same way regardless of whether the pager data message arrives at the easy-reach device 112 before or after the calling party's call. Its purpose is to store the called party information in the called party field 404 of the database entry 401 associated with the calling party.

At step S2002, the controller 202 receives a pager data message from the pager 116 that includes the pager's capcode and the called party information, and advances to step S2005. At step S2005, the controller 202 identifies the calling party and advances to step S2008. At step S2008, the controller 202 locates the entry 401 associated with the calling party in the database 400, and advances to step S2012. At step S2012, the controller 202 stores the called party information in the called party field 404 of the entry 401. Then the controller 202 advances to step S2014.

At step S2014, a timer is incremented and the controller 202 advances to step S2016. At step S2016 the controller 202 checks whether the timer has exceeded a maximum value. The maximum value should give the calling party enough time to call the easy-reach device 112 from the terminal 108 after transmitting the pager data message. If at step S2016 the timer has not exceeded the maximum value, the controller 202 returns to step S2014; otherwise the controller 202 clears the called party field 404 of the entry 401, and ends the process.

Figure 7:
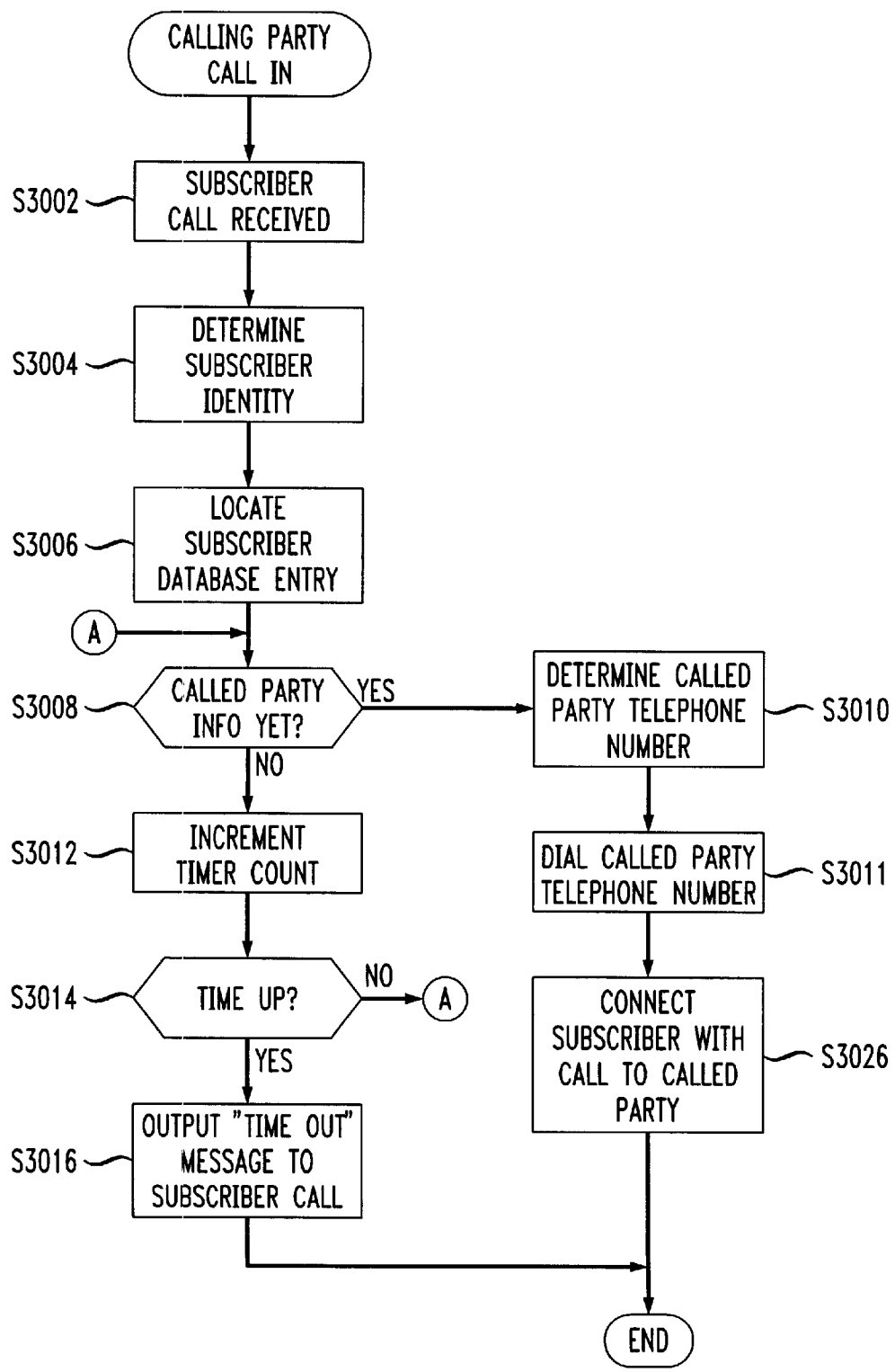
FIG. 7 is a flow chart for processing information received over the first communication channel in a second embodiment of the invention.

FIG. 7 shows a process of the easy-reach device 112 performed by the controller 202 in another embodiment of the invention. At step S3002, the controller 202 receives the calling party's call and then advances to step S3004. At step S3004, the controller 202 determines the identity of the calling party based on the calling party's call. Then the controller 202 advances to step S3006.

At step S3006, the controller 202 locates the entry 401 associated with the calling party from the memory 204 and then advances to step S3008. At step S3008, the controller 202 checks the called party field 404 of the entry 401. If no called party information is found in the called party field 404, the expected pager data message has not yet arrived, so a timer is incremented at step S3012 and the controller 202 advances to step S3014.

At step S3014, the controller 202 checks whether the timer has exceeded a maximum value. If the timer has not exceeded a maximum value, the controller 202 returns to step S3008; otherwise the controller 202 advances to step S3016. At step S3016, the controller 202 outputs an appropriate "time out" ending message to the calling party, and ends the process.

At step S3008, if the called party information is found in the called party field 404, the controller 202 advances to step S3010. At step S3010, the controller 202 determines the called party number from the called party information and advances to step S3011. At step S3011, the controller 202 dials the called party number and advances to step S3026. At step S3026, the controller 202 connects the calling party with the called party via the bridge 206, and end the process.

Thus, in this embodiment, once the controller 202 has dialed the called party number at step S3011, the calling party is immediately connected to the outgoing call. The calling party hears the result of the call (telephone ringing signal, busy signal, etc.) and can hang up when he pleases, or signal the easy-reach device 112 for other options. These options can include having the easy-reach device 112 repeatedly dial the called party at predetermined intervals. Then, upon establishing communication with the called party, the easy-reach device 112 can output a "please hold" message to the called party, and can page the calling party so that the calling party may dial the easy-reach device 112 and be connected with the called party. Many other alternatives are also possible.

While this invention has been described in conjunction with specific embodiments outlined above, it is evident that many alternatives, modifications and variations will be apparent to those skilled in the art. For example, the transmitting functions of a transceiver (which comprises a transmitter and a receiver) may be accomplished by a transmitter, the receiving functions of a transceiver may be accomplished by a receiver.

Additionally, while in the disclosed embodiment the database 400 contains an entry 401 for each calling party, a much smaller dynamic database could be used. For example, the controller 202 could create a new entry 401 for a calling party when either the pager data message or the call from the calling party first arrives and the calling party is identified, and then discard the entry 401 once the calling party is connected with the called party.

Further, the various terminals used by the calling and called parties may include fixed telephones, cellular telephones, computers, pagers, and other data terminals. The types of communication that can be established between the calling and the called parties may include voice communication, computer or other data transmissions, video signals, or other types of communication.

Accordingly, the preferred embodiments of the invention as set forth herein are intended to be illustrative, not limiting. Various changes may be made without departing from the scope of the invention as defined in the following claims.

What is claimed is:

1. A communications method, comprising the steps of:
   receiving a first call over a first communication channel, from a calling party from a first terminal;
   receiving data over a second communication channel, from the calling party from a portable communication device different than said first terminal, said data including a called party identifier selected by the called party from a called party identifier directory; and
   connecting the calling party with a called party by establishing a second call received at a second terminal and by linking the first terminal with the second terminal, wherein said second call is established based on said data received over the second communication channel.

2. The method of claim 1, wherein the call is received before receiving the data, the connecting step comprising:
   waiting to receive the data from the second communication channel;
   after receiving the data, determining the called party telephone number from the data; and
   connecting the called party based on the called party telephone number determined from the data.

3. The method of claim 1, wherein the data is received before the call, the connecting step comprises:
   storing the data in a database;
   waiting to receive the call;
   retrieving the data from the database after receiving the call;
   calling the called party based on the data retrieved from the database; and
   connecting the called party with the calling party.

4. The method of claim 1, further comprising identifying the calling party based on information received over the first communication channel.

5. The method of claim 1, wherein the called party identifier comprises a called party telephone number.

6. The method of claim 1, further comprising retrieving information from a database entry associated with the calling party after receiving the call.

7. The method of claim 6, further comprising identifying the called party based on the data received from the calling party over the second communication channel.

8. The method of claim 1, further comprising:
   retrieving information from a database entry associated with the calling party after receiving the call; and
   identifying the called party based on the retrieved information.

9. The method of claim 1, wherein the call is received over the first communication channel before the data is received over the second communication channel.

10. The method of claim 1, wherein the call is received over the first communication channel after the data is received over the second communication channel.

11. The method of claim 1, wherein the data are transmitted over the second communication channel by a portable personal communication device that transmits the data in a radio wave transmission through air.

12. The method of claim 1, wherein a telephone network comprises the first communication channel.

13. The method of claim 1, wherein a paging network comprises the second communication channel.

14. The method of claim 1, wherein a telephone network comprises the first communication channel and a paging network comprises the second communication channel.

15. A method for making a telephone call, comprising:
   establishing a first telephone call connection between a first telephone terminal and an easy-reach device over a first communication channel;
   transmitting data from a portable communications device to the easy-reach device over a second communication channel, the data including a selection of a called arty identifier from a called party identifier directory;
   establishing a second telephone call connection between the easy-reach device and a second telephone terminal based on the data received over the second communication channel; and linking the first terminal with the second terminal by bridging the first and second telephone call connections.

16. The method for making a telephone call of claim 15, further comprising establishing the first telephone call connection before transmitting the data from the portable communications device.

17. The method for making a telephone call of claim 15, further comprising transmitting the data from the portable communications device before establishing the first telephone call connection.

18. The method for making a telephone call of claim 15, further comprising:
   obtaining data identifying a calling party from the first telephone call connection; and
   storing the data identifying the calling party in a database.

19. The method for making a telephone call of claim 15, wherein a paging network comprises the second communication channel.

20. A communications method, comprising:
   receiving a call from a first terminal over a first communication channel;
   receiving data from a portable communications device over a second communication channel, the data including a selection of a called party identifier from a called party identifier directory;
   using the data received over the second communication channel to make a second telephone call to a second telephone terminal; and
   linking the first terminal with the second terminal by bridging the first and second telephone calls.

21. The communications method of claim 20, further comprising receiving the first telephone call from the first telephone terminal before receiving the data from the portable communications device.

22. The communications method of claim 20, further comprising receiving the data from the portable communications device before receiving the first telephone call from the first terminal.

23. The communications method of claim 20, further comprising:
   obtaining data identifying a calling party from the first telephone call; and
   storing the data identifying the calling party in a database.

24. The communications method of claim 20, wherein a telephone network comprises the first communication channel.

25. The communications method of claim 20, wherein a paging network comprises the second communication channel.

* * * * *